United States Patent

[11] 3,555,337

[72] Inventors Sixdeniel Faria; Dominic T. Palumbo, Towanda, Pa.
[21] Appl. No. 760,181
[22] Filed Sept. 17, 1968
[45] Patented Jan. 12, 1971
[73] Assignee Sylvania Electric Products Inc. a corporation of Delaware

[54] ELECTRIC DISCHARGE DEVICE WITH DYSPROSIUM ACTIVATED YTTRIUM VANADATE PHOSPHORS
8 Claims, 8 Drawing Figs.

[52] U.S. Cl. .......... 313/109, 117/33.5; 252/301.4
[51] Int. Cl. .......... H01j 1/63, H01j 63/04
[50] Field of Search .......... 313/92Ph, 109; 252/301.4, 301.4P; 117/33.5

[56] References Cited

UNITED STATES PATENTS

| | | | |
|---|---|---|---|
| 3,152,085 | 10/1964 | Ballman et al. | 252/301.4 |
| 3,322,682 | 5/1967 | Thompson | 252/301.4 |
| 3,360,673 | 12/1967 | Vanderpool et al. | 313/109X |

*Primary Examiner*—Roy Lake
*Assistant Examiner*—David O'Reilly
*Attorneys*—Norman J. O'Malley and Owen J. Meegan

ABSTRACT: Compounds of dysprosium activated yttrium vanadate are novel and useful phosphors which luminesce when exposed to a source of activating radiation. The phosphors of the present invention can be advantageously employed in low pressure and high pressure electric discharge devices such as fluorescent or mercury lamps and the like.

SIXDENIEL FARIA
DOMINIC T. PALUMBO
INVENTORS
BY Owen J. Meegan
ATTORNEY

PATENTED JAN 12 1971

3,555,337

SIXDENIEL FARIA
DOMINIC T. PALUMBO
INVENTORS
BY Owen J. Meegan
ATTORNEY

SIXDENIEL FARIA
DOMINIC T. PALUMBO
INVENTORS
BY [signature]
ATTORNEY

ELECTRIC DISCHARGE DEVICE WITH DYSPROSIUM ACTIVATED YTTRIUM VANADATE PHOSPHORS

BACKGROUND OF THE INVENTION

1. Field of the Invention

This invention relates to synthetic inorganic phosphors. More precisely, the invention disclosed herein relates to compounds of dysprosium activated yttrium vanadate which function as phosphors when exposed to a source of activating radiation.

2. Description of the Prior Art

Phosphors are known products of commerce. Generally the term is employed in the art to describe luminescent or fluorescent solids which comprise two essential ingredients; a "host matrix" and an "activator." Better known host materials include silicates, phosphates, sulfides, selenides, the alkali halides and oxides of calcium, magnesium, barium zinc as well as other materials which could be mentioned. Activators most frequently employed include among others, copper, silver, thallium, lead, cerium, chromium, titanium and tin. Oftentimes, amounts ranging from only a few parts per million to several percent can confer fluorescent properties on the host compound. Generally synthetic phosphors are readily prepared by reacting well mixed finely divided powders of the host and activators at high temperatures.

SUMMARY OF THE INVENTION

In accordance with the present invention, compounds of yttrium vanadate activated with dysprosium are presented as novel and useful phosphors. The novel phosphors of the present invention luminesce when exposed to radiation of 2537A, and 3650A. Accordingly, they can be advantageously employed in fluorescent lights as well as in high pressure mercury discharge lamps. However, the novel phosphors of the present invention are especially useful as phosphors in mercury discharge lamps. When employed in this application they provide desirable brightness and maintenance characteristics as compared to phosphors presently employed in this application.

Essentially, the novel phosphors of yttrium vanadate activated by dysprosium conform to the following formula:

$$Y_{1-x}VO_4:Dy_x$$

Where the $Y_1-_xVO_4$ portion of the formula represents the yttrium vanadate host matrix while the $Dy_x$ portion represents the activator. Also in the above formula, $x$ represents the amount of dysprosium in the phosphor.

The amount of dysprosium suitably employed as activator can vary over a rather wide range. However, the best balance of presently desired properties are obtained when the concentration of dysprosium is between about 0.05 to about 10 or somewhat higher mole percent dysprosium per gram mole of phosphor. Accordingly, in the preferred phosphors of the present invention, $x$ is between about 0.0005 to about 0.1.

In a special aspect of the present invention minor amounts (up to about 50 percent of the activator content) of other rare earths can be included in the activator system of the phosphor together with dysprosium. Such rare earths include among others, europium, erbium, samarium, praseodymium, thulium and the like. By including such rare earths or combinations thereof, the emission characteristics of the phosphors of the present invention can be selectively adjusted for specialized applications. For example, the emission characteristics of the ultimate phosphor will manifest the wavelength of the particular rare earth(s) employed.

DESCRIPTION OF THE PREFERRED EMBODIMENTS

Figure 1:
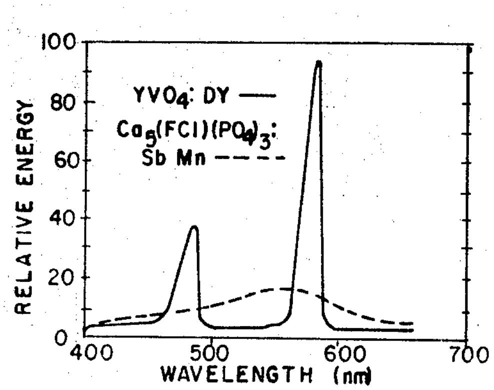

The phosphors of the present invention have excellent brightness and can be advantageously employed as phosphors in fluorescent lamps and in high pressure mercury discharge lamps. Some of the advantages to be derived by employing phosphors of the present invention will become apparent by reference to FIG. 1. Said FIG. illustrates the emission spectrum at 2537A. excitation of a dysprosium activated yttrium vanadate phosphor (0.3 mole percent Dy) as compared to a cool white $Ca_5(FCl)(PO_4)_3$:$SbMn$ phosphor. Note the narrow band emissions and that the blue-green and yellow peaks are in the same general area. This feature qualifies the phosphors of the present invention for use in aperture lamps such as those used in photoduplicating devices.

Figure 2:
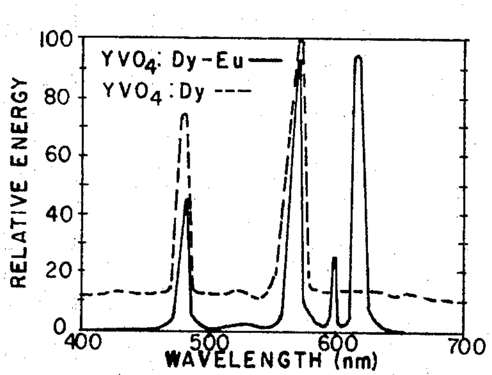

Phosphors of the present invention are especially suitable for use in high pressure mercury lamps. The color produced by the phosphor-mercury lamp combination is a yellowish green. Quite surprisingly, when employed in this application, the phosphors of the present invention will absorb the 3022A. and 3122A. as well as the 3650A. mercury lines and are also not adversely affected by the high operating temperatures. FIG. 2 illustrates the spectral energy distribution of a dysprosium activated yttrium vanadate phosphor (0.3 mole percent Dy) at 3650A excitation.

The phosphors of the present invention can be prepared by the high temperature reaction of well mixed mixtures of compounds containing the ingredients of the phosphor. In general, decomposable organic or inorganic compounds such as the salts of oxides containing the desired ingredients can be suitably employed. The best balance of properties are usually obtained by selecting proportions of the respective compounds sufficient to produce a phosphor wherein the ratio of cations to anions in the final phosphor is substantially stoichiometric. In accordance with the practice of the present invention, suitable phosphors can be prepared by heating mixtures of compounds at a temperature between about 700° C to about 1200° C for from 1 hour to about 8 hours. An example of a method suitable for preparing a phosphor of the present invention follows. It is to be understood that this example is illustrative in nature and in no way should it be construed so as to limit the invention beyond those limitations expressly set forth in the present specification and in the appended claims.

EXAMPLE I

Mix 70 grams of $Y_2O_3$, 175.0 grams $NH_4VO_3$ (150 percent excess) and 0.321 grams $Dy_2O_3$. Fire the mixture at 1700° F for 2 hours in an open quartz crucible. Wash the cool powder in hot 15 percent NaOH. Then wash with hot de-ionized water until neutral. Dry and screen through a 325 mesh sieve.

Figure 3:
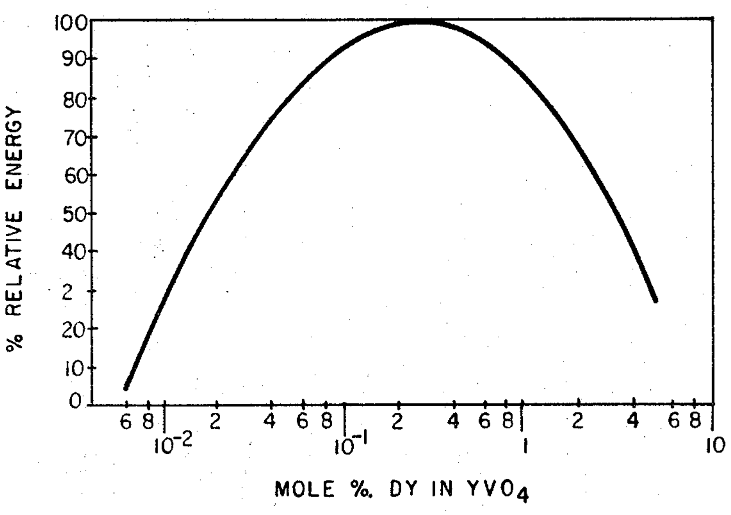

The phosphor produced as described above contains 0.28 mole percent dysprosium per gram mole of phosphor. As stated, the mole percent can be varied over a wide range as indicated by FIG. 3 which illustrates the response vs the dysprosium concentration.

Figure 4:
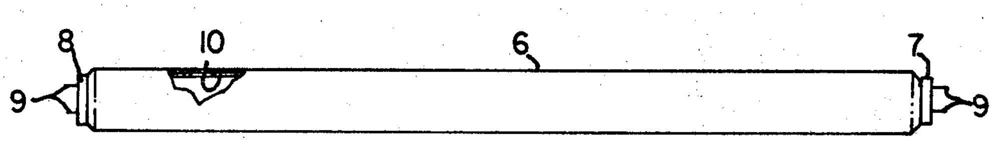

The manners of employing the phosphors of the present invention in fluorescent lamps will be better understood by referring to FIG. 4 which is a plan view of a fluorescent lamp containing an internal coating of a phosphor of the present invention. Referring now to FIG. 4, a typical fluorescent lamp containing mercury vapor is shown including a glass envelope 6 having end caps 7 and 8 with electrical lead-in wires 9. A layer 10 of a phosphor of the present invention is coated on the internal surface of the glass envelope 6.

Table I below contains data relating to fluorescent lamps utilizing phosphors of the present invention.

TABLE I $YVO_4$:Dy Fluoresecent Lamp Data

| | Lumens | | X, Y coordinates | | LPW | |
|---|---|---|---|---|---|---|
| Mole percent Dy | 0 hrs. | 100 hrs. | X | Y | 0 hrs. | 100 hrs. |
| 2.8 | 1,145 | 1,130 | | | 30 | 30 |
| 0.10 | 2,576 | 2,035 | | | 64 | 51 |
| 0.28 | 2,921 | 2,616 | .376 | .440 | 75 | 67 |
| 0.30 | 2,968 | 2,492 | .373 | .439 | 76 | 64 |

Figure 5:
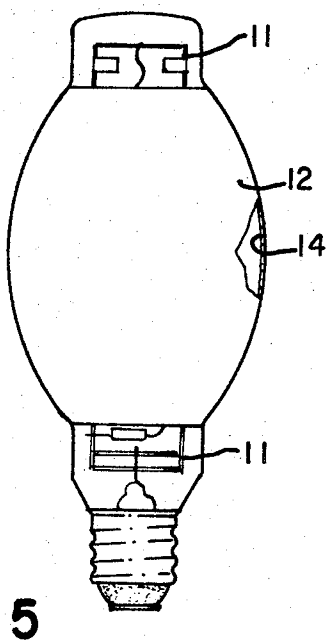

In accordance with an especially preferred embodiment of the present invention, the phosphors presented are advantageously employed in high pressure mercury discharge lamps. This embodiment will be better understood by reference to FIG. 5 which is an elevational view of a high pressure mercury lamp with a portion of the jacket broken away to show the coating of phosphor. Referring now to FIG. 5, the high pressure mercury lamp is shown which includes the conventional arrangement of an arc tube (not shown) supported on a metal harness 11. Surrounding the arc tube and harness is a bulbous envelope 12 with a coating 14 of a phosphor of the present invention disposed upon the internal surfaces thereof.

In this aspect of the invention, the activator systems of the phosphors of the present invention can advantageously include minor amounts of a rare earth metal in combination with dysprosium. Accordingly, the phosphors of the present invention include those conforming to the following formula:

$$Y_{1-(x+y)}VO_4:Dy_xM_y$$

where the $Y_{1-(x+y)}VO_4$ portion represents the host matrix and the $Dy_xM_y$ portion represents the activator system. M represents a coactivator with dysprosium and is a rare earth metal such as erbium, samarium, praseodymium, thulium and europium. The symbols $x$ and $y$ represents the amounts of dysprosium and M respectively.

The amounts of dysprosium and coactivator M can vary over a wide range depending primarily on the specialized properties desired of the ultimate phosphor. In general, however, the amount of coactivator, M, in the activator system will be, in most cases, less than the amount of dysprosium. If greater quantities of the coactivator are used, the dysprosium emission is slightly quenched. Moreover, preferred properties are obtained in phosphors wherein the concentration of dysprosium and M is between about .05 to about 10 mole percent dysprosium and M per gram mole of phosphor. Accordingly, in the preferred phosphors of this aspect of the present invention, the sum of $x + y$ will be between about 0.0005 to 0.1 while $x$ will be an integer between about 0.0004 to about 0.1 and $y$ will be an integer between about 0.0001 to about 0.05.

The following example illustrates a manner for producing a coactivated phosphor of the present invention.

EXAMPLE II

Mix 70 grams $Y_2O_3$, 140 grams $NH_4VO_3$ (150 percent excess), and 0.321 grams $Dy_2O_3$ and 0.024 grams of $Eu_2O_3$. Fire the mixture at 1,700° F. for 2 hours in an open quartz crucible. Wash the cool powder in hot 15 percent NaOH. Then wash with hot de-ionized water until neutral. Dry and screen through a 325 mesh screen. The phosphor contains 0.28 mole percent dysprosium and 0.03 mole percent europium per gram mole of phosphor.

Table II below contains data relating to high pressure mercury vapor lamps employing europium coactivated phosphors of the present invention.

TABLE II $YVO_4$:Dy, Eu In High Pressure Mercury Vapor Lamps (400 watts)

| | Mole percent | | 0 hrs. | | 100 hrs. | |
|---|---|---|---|---|---|---|
| Phosphor | Dy | Eu | LPW | Percent red | LPW | Percent red |
| Control | 0.28 | None | 62.5 | 2.56 | 58.4 | 2.65 |
| A | 0.28 | 0.03 | 62.5 | 3.22 | 58.0 | 3.31 |
| B | 0.28 | 0.05 | 62.2 | 3.50 | 58.1 | 3.35 |
| C | 0.28 | 0.07 | 61.6 | 3.90 | 56.6 | 3.88 |
| D | 0.28 | 0.09 | 62.0 | 4.15 | 56.7 | 4.30 |
| E | 0.28 | 0.11 | 61.9 | 4.52 | 56.1 | 4.50 |
| F | 0.28 | 0.22 | 59.6 | 5.74 | 55.5 | 5.75 |
| G | 0.28 | 0.30 | 59.1 | 6.98 | 55.3 | 6.64 |

Figure 6:
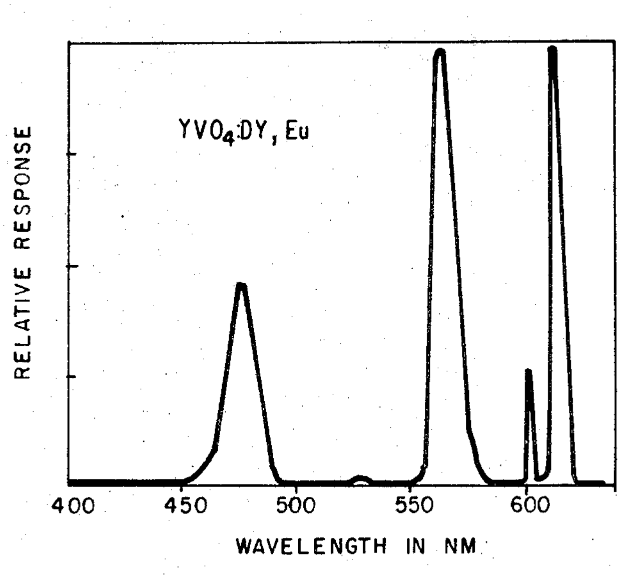

Sample G containing 0.28 mole percent Dy and 0.30 mole percent Eu is represented by the emission spectrum shown in FIG. 6.

Other rare earth metals such as those mentioned above can be employed as coactivators in the phosphors of the present invention to tailor or modify the spectral response thereof for specialized applications. application.

Figure 7:
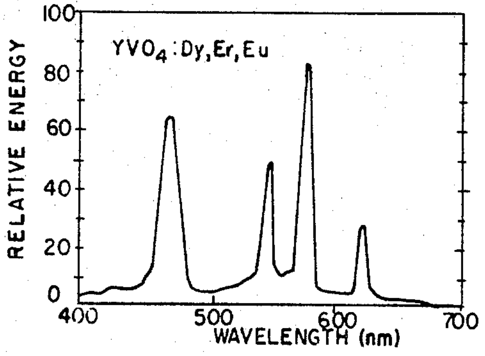

In FIG. 7 the dysprosium-europium activated matrix is further modified with erbium. The lines at about 550 nm are partially attributable to the erbium, although the europium peak at about 610 nm is substantially decreased. Hence, the emission characteristics of the phosphor can be substantially modified by including additional rare earth metals in the matrix.

Figure 8:
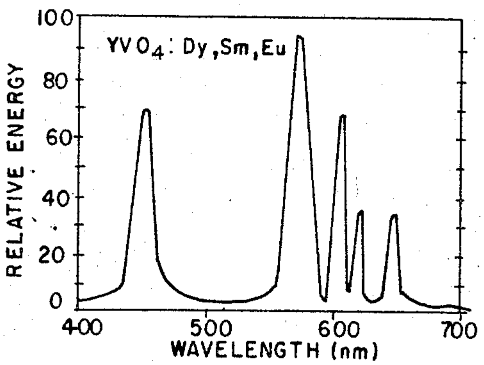

When samarium is added to the dysprosium-europium activated matrix, new emission peaks occur at 610 and 650 nm as shown in FIG. 8. The dysprosium peaks at 480 and 570 nm are still present in approximately the same intensity.

It is apparent that modifications and changes may be made within the spirit and scope of the instant invention. It is our intention, however, only to be limited by the scope of the appended claims.

We claim:

1. A low pressure electric discharge device comprising a glass envelope containing mercury vapor, means to produce a mercury discharge within said envelope; a phosphor powder coated upon the interior surface of said envelope and adapted to be excited by said mercury discharge, said phosphor consisting essentially of yttrium vanadate activated by dysprosium.

2. The device according to claim 1 wherein there is between about 0.05 to 10 mole percent dysprosium per mole of yttrium vanadate.

3. The device according to claim 1 wherein an additional rare earth metal is disposed in the matrix as a coactivator with the dysprosium, said additional rare earth metal being in quantities less than the dysprosium.

4. The device according to claim 3 wherein said additional rare earth metal is europium, erbium, samarium, praseodymium, thulium or mixtures thereof.

5. A high pressure mercury lamp comprising: an arc tube adapted to emit a mercury discharge, an enclosing light transmitting outer jacket disposed about said arc tube and a phosphor powder coated upon the interior surface of said outer jacket and adapted to be excited by said mercury discharge, said phosphor consisting essentially of yttrium vanadate activated by dysprosium.

6. The lamp according to claim 5 wherein there is between about 0.05 to 10 mole percent dysprosium per mole of yttrium vanadate.

7. The lamp according to claim 5 wherein an additional rare earth metal is disposed in the matrix as a coactivator with the dysprosium, said additional rare earth metal being in quantities less than the dysprosium.

8. The lamp according to claim 7 wherein said additional rare earth metal is europium, erbium, samarium, praseodymium, thulium or mixtures thereof.